(12) United States Patent
McGowan

(10) Patent No.: US 6,592,232 B2
(45) Date of Patent: Jul. 15, 2003

(54) AUGMENTED BACKLIGHT

(75) Inventor: Steven Bernard McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/991,859

(22) Filed: Nov. 16, 2001

(65) Prior Publication Data

US 2003/0095397 A1 May 22, 2003

(51) Int. Cl.[7] ............................................... G01D 11/28
(52) U.S. Cl. .......................... 362/27; 362/26; 362/30; 362/31; 362/276; 362/551; 362/561
(58) Field of Search ............................ 362/27, 26, 30, 362/276, 31, 551, 561; 385/146, 43, 129, 131; 350/345; 359/49

(56) References Cited

U.S. PATENT DOCUMENTS 4,236,223 A * 11/1980 Stanly et al. ................ 708/173
2002/0050974 A1 * 5/2002 Rai et al. ..................... 345/102

* cited by examiner

*Primary Examiner*—Sandra O'Shea
*Assistant Examiner*—Mark Tsidulko
(74) *Attorney, Agent, or Firm*—Marger Johnson & McCollom, P.C.

(57) ABSTRACT

An optical system using ambient light. The system includes a screen to be illuminated, an internal light source and an external light collector to collect ambient light to illuminate the screen. A switch may be used to activate the internal light source, providing internal light to be combined with the ambient light to illuminate the screen. A light sensor may also be used to detect the level of light presented to the screen, with or without a controller to automatically control the process of providing illumination to the screen.

26 Claims, 2 Drawing Sheets

AUGMENTED BACKLIGHT

BACKGROUND

1. Field

This disclosure relates to display systems, more particularly to display systems that require an external light source.

2. Background

Many products such as cameras, personal digital assistants (PDAs), electronic picture frames, laptops, portable electronic games, etc., employ display systems to convey information to a user. There are two general classes of these display systems; those that inherently provide a light source and those that require an external light source. Those that inherently provide a light source include cathode-ray tubes (CRTs), light-emitting diode (LEDs), incandescent displays and plasma displays. Those that require an external light source include liquid crystal displays (LCDs), digital micromirror devices (DMD™), and other micromechanical displays. Embodiments of the invention, as will be discussed later, also applies to discrete indicators such as LEDs and incandescent bulbs used in environments where power consumption is more important than cost.

Optical recording systems include such common appliances as video and still cameras. They record images or data corresponding with those images as received by the optics of the system. Many of these systems, especially those using digital technology, provide a separate viewfinder or display for the user.

Typically, the separate viewfinder is electronic, as opposed to the optical viewfinder through which a user looks to frame the subject. Optical viewfinders are generally found on every type of camera, be they still or video cameras, digital or analog. The electronic viewfinder recreates the image on a small display, allowing the user the chance to see the image in another manner before recording the scene. This viewfinder typically includes some sort of screen, usually an LCD (liquid crystal display) screen, and the appropriate electronics that accompany the screen.

There are two types of LCD display systems, reflective and backlit. Reflective LCDs place a mirrored surface behind the LCD and depend on the reflected ambient light to illuminate the image. With reflective designs, light must pass through the LCD, reflect off the mirrored surface, and pass back through the LCD a second time to the user. Due to the inherent optical transmission losses of LCDs, as much as 60% for a color LCD, reflective systems provide low contrast images that cannot be seen at all in dark environments. The alternate method, which is more expensive in both cost and power, is to use backlit screens. Backlit designs provide a light source that does not depend on ambient light. Backlit systems work well in dark environments but provide low contrast images when the ambient light is bright relative to the backlight source. This patent describes a technique that combines the low power and bright ambient viewing features of reflective designs with the high contrast and dark environment viewing features of backlit designs.

On some cameras screens allow the user to view and frame the current scene in real-time for image capture, to display option menus and status information, and to review images stored in memory, acting as a display. Physical controls on the camera (typically buttons and cursor pads) allow the user to determine what is displayed on the screen: real-time images, menus, status information, stored images, etc. To minimize the number of physical controls on the device, menus are displayed on the screen. The user may employ a simple set of cursor and selection controls to identify the desired menu options, such as reviewing the images, saving them or deleting them.

In either case, the camera must provide illumination to the screen to allow the user to view the images. Using a backlight for such a screen consumes a relatively large amount of battery power, requiring the batteries to be replaced or recharged more frequently than is convenient. In addition, the power of the backlight provided to the screen may not overcome the ambient illumination. For example, the user may try to review images in the camera, or record scenes, on a very bright day. The surrounding light may over power back light and the user will not see the images on the screen very clearly.

This problem could occur with any device with a display that is not self-illuminating. Self-illuminating displays would include such things as plasma and cathode-ray tube (CRT) displays that provide illumination as part of the process that actually forms the image. Displays that are not self-illuminating would include those with any kind of separate light source, such as LCD displays, either reflective or transmissive, digital micromirror displays (DMD™), and the like. Examples of such devices may include video cameras, still cameras, video game players, music players, and personal digital assistants (PDAs).

Therefore, it would seem desirable to have some method or apparatus to provide boosting power to the illumination of the screen, as well as reduce battery consumption.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
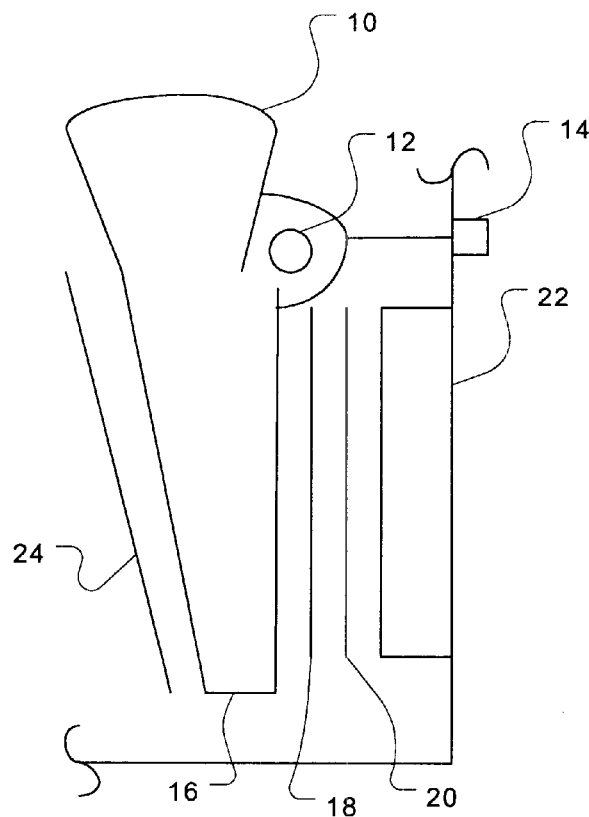
FIG. 1 shows an embodiment of an optical system, in accordance with the invention.

FIG. 1 shows an embodiment of an optical system that uses ambient light, in accordance with the invention. A light collector 10 collects the ambient light and directs it to the screen 22 that is to be illuminated. The screen 22 is an array of picture elements (pixels) whose individual light transmissivity is controlled to present an image, in essence a light valve. The "brightness" of the screen is the average transmissivity of all pixels. The light collector may be referred to as an external light collector or an external light source, since the top of the light collector 10 is on the outside surface of the device using ambient light.

The device may be any device that uses a light source separate from the device that forms the images. For example, the device may be a still camera, a video camera, a personal digital assistant, a remote control, a music player, or a video game player, as examples. In the camera examples, the illumination may be used to light a viewfinder or a display, or both, if separate.

The optical system of the device may also contain an internal light source 12, typically with a surrounding reflector. The optical system is arranged so as to allow the internal light source 12 to channel the internal light such that it is optically coupled with the ambient light from the collector 10. In an embodiment the light from both is channeled into a wedge-shaped light pipe 16, but may be combined together in many different ways. An alternative embodiment for channeling internal and ambient light to the screen 22 may include a beam splitter or comparable optical device. Specific implementations of the combination of ambient and internal light are left to the system designer.

In one embodiment, the system has no automation in that the combination of external light with internal light is performed only upon a user input. For example, the device may use only ambient light in the optical system. When the user desires a brighter display on the screen, the user presses a button or switch 14 that turns on the internal light. This causes the internal light to be added to the ambient light in illuminating the screen 22.

Figure 2:
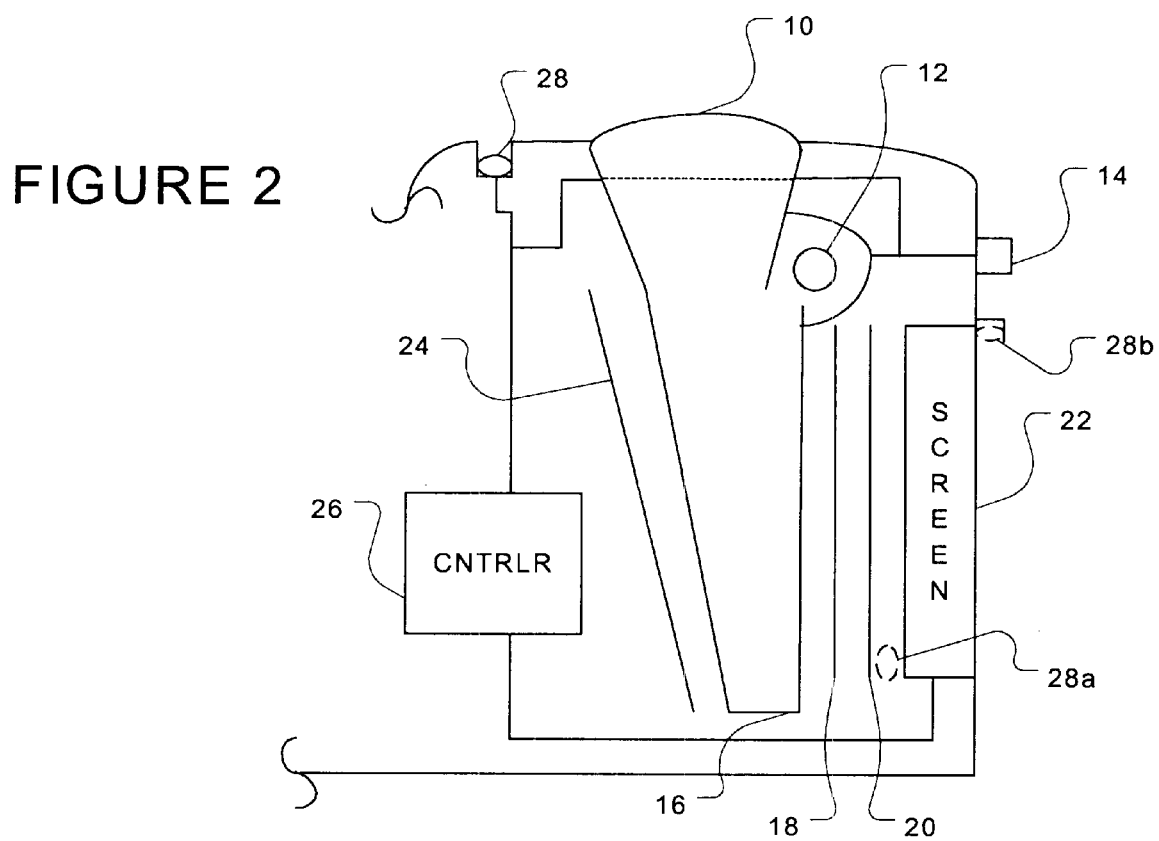
FIG. 2 shows an embodiment of an optical system, in accordance with the system.
Figure 3:
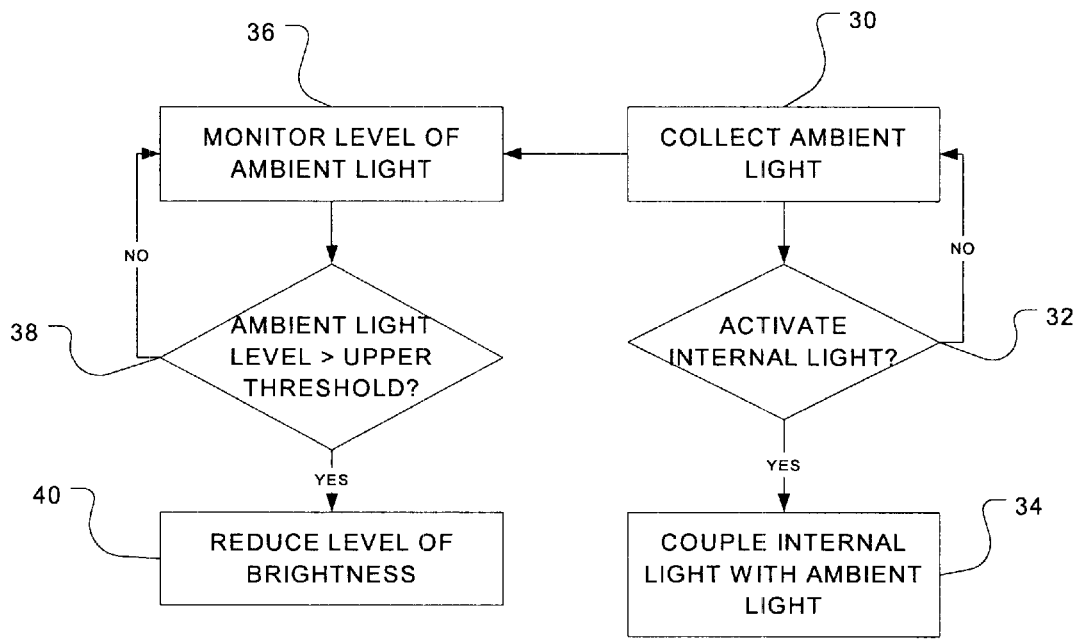
FIG. 3 shows a flowchart of an embodiment of a method to provide illumination using ambient light, in accordance with the invention.

In FIG. 3, an embodiment of the process of illuminating an optical system with ambient light can be seen in flowchart form. At 30, the ambient light is collected. At 32 the decision is made to activate the internal light or not. If the internal light is activated, the internal light is coupled with the ambient light at 34. Otherwise the process returns to monitoring the process that determines whether to activate the internal light at 30. As will be discussed with more detail with reference to FIGS. 2 and 4, the determination could be made automatically.

Another problem that may arise is that rather than not having enough ambient light, there may be too much. At 36, the level of ambient light is monitored. If the ambient light level is above a predetermined threshold at 38, the brightness level of the optical system is reduced at 40. This may involve a user monitoring the level of ambient light at 36, and determining that it is too high at 36. The brightness reduction could be the user manipulating the brightness control of the screen to lower it.

Depending upon the particular device within which the optical system is to be used, other components may be added to the optical system. Referring back to FIG. 1, other components may include a white reflective surface 24, and a diffuser 18 that may be required to more uniformly distribute the light over the surface of the screen. If the screen 22 uses polarized light, such as a liquid crystal display (LCD), a polarizing filter 20 may be required to polarize the light prior to it being used to illuminate the screen. These are just examples of other components, and are not intended to limit application of the invention in any way.

The determination of whether the internal light source is needed may be more automated, as desired by the system designer. In the embodiment shown in FIG. 2, an external light sensor allows the level of ambient light to be detected and monitored. This may be in addition to the switch 14 or instead of it. In addition to the light sensor 28, a controller 26 may also be used to activate or inactivate the internal light source 12 and control the brightness of the screen 22.

The light sensor 28 could reside in one of several locations. As shown in FIG. 2, one position is adjacent the top of the light pipe, at 28. This would most likely allow the most accurate reading of ambient light entering the pipe or other optical coupling device. Alternative positions include those at 28a and 28b, shown in dotted lines. The position at 28a may provide more accurate information as to the amount of light available at the back side of the display screen. Position 28b may provide the most accurate information as to the amount of illumination actually seen by the user, referred to here as user-displayed brightness level.

In addition, position 28b may rely upon inputs from some reference pixels in the screen. They would be positioned so as to not interfere with display of the image, but would allow the sensor to determine the user-displayed brightness level. Any of these positions will provide information as to the amount of ambient light available to make the determination if the internal light source needs to be used. For example, in position 28b, the sensor may provide the controller with information that indicates that the user-displayed reference level is not sufficient and then turn on, or increase the power of, the internal light.

Figure 4:
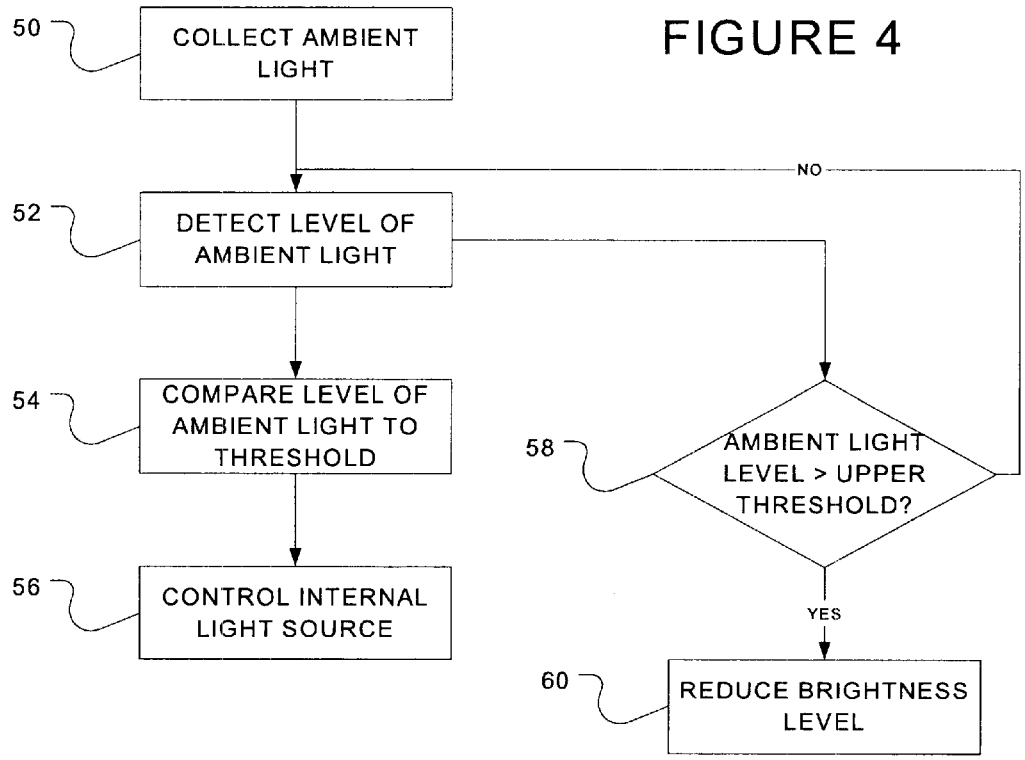
FIG. 4 shows a flowchart of an embodiment of a method to provide illumination at a specified level using ambient light, in accordance with the invention.

Referring to FIG. 4, it can be seen how a controller may be used to automatically adjust the amount of internal light added to the system. The system collect ambient light at 50, and then detects the level of ambient light at 52. The level of ambient light is then compared to an illumination threshold at 54. The illumination level 54 is the desired amount of illumination for the screen.

At 56, the internal light source is controlled as needed to provide illumination at the threshold level. If the ambient light is bright enough, the internal light source will be turned or left off. If the ambient light is not bright enough to meet the illumination level desired, the internal light source will be turned on to provide more light. Turning on the internal light source could be the only level of control required, with the light source either on or off. In more complex systems, the internal light source could be controlled to provide more or less illumination, depending upon how much is required to bring the over all illumination up to the desired level.

In some instances, the level of ambient light may exceed a desired threshold. At 58, the ambient light may also be compared to an upper illumination threshold, similar to that as discussed with reference to FIG. 3. If the ambient light is above an upper threshold, the brightness level produced at the screen is controlled at 60. If the ambient light does not exceed the upper threshold, then the process returns to monitoring the level of ambient light at 52.

The thresholds for the both the illumination level, sometimes referred to as the lower threshold, and the upper threshold may be determined by the user or by the system, and may be predetermined or determined dynamically. For example, the user may set a preference as the brightness of the screen, or the upper threshold. When the ambient light exceeds this threshold, the system may automatically adjust the brightness produced by the screen to stay under or equal to this threshold. Alternatively, the user could just manually adjust the brightness level of the screen, as another example.

Similarly, the lower threshold could be determined by the system designer, the user, or dynamically. The user may designate this same brightness threshold as the desired brightness for the screen, if the ambient light is below this threshold, the system could turn on the internal light source. In this case, the upper threshold and lower threshold are the same. These thresholds may also be the ends of a range of possible illumination levels. Alternatively to the system turning on the light source, the user could turn on the internal light source with the switch.

As yet another possibility, the illumination threshold used as the lower threshold or as both the lower threshold and the upper threshold could be determined by the system. The system could automatically adjust the brightness of the screen depending upon the level of ambient light. The controller may be loaded with a predetermined set of levels. For example, when the ambient illumination is high, the system turns off the internal light source to save power and possibly reduces the brightness of the screen. When the ambient illumination is low the system turns on the internal light source and increases the brightness of the screen. To conserve more power the brightness of the screen may be set to its maximum and the output level of the internal light source controlled to determine the brightness of the image as seen by the user.

The mix of features and capabilities with regard to automation or user selection is left primarily up to the system designer. Application of the invention will allow a device to utilize ambient illumination for illuminating a screen to conserve power. The user or the system also may use an internal light source to tune the illumination at the screen to a desired level. Control of the light source can be optimized to provide the desired illumination level at a minimum cost in battery power.

Thus, although there has been described to this point a particular embodiment for a method and apparatus for a method and apparatus to provide illumination using ambient light, it is not intended that such specific references be considered as limitations upon the scope of this invention except in-so-far as set forth in the following claims.

What is claimed is:

1. An optical system, comprising:
   a screen;
   an internal light source;
   an external light collector to collect ambient light to illuminate the screen;
   a switch to activate the internal light source as needed; and
   a light pipe to couple the ambient light with any light from the internal light source.

2. The optical system of claim 1, wherein the optical system further comprises an external light sensor to identify a level of ambient light.

3. The optical system of claim 2, wherein the optical system further comprises a controller operable to control a level of internal light depending upon the level of ambient light.

4. The optical system of claim 1, wherein the switch is also to allow a user to set activation of the internal light source to be automatic.

5. An optical system, comprising:
   an external light sensor to identify a level of ambient light;
   an external light collector to collect the ambient light;
   an internal light source to provide internal light;
   a screen to display images; and
   a light pipe to couple the ambient light and the internal light so as to provide an illumination level to the screen.

6. The optical system of claim 5, wherein the system further comprises a controller to control the amount of internal light produced by the light source depending upon the level of ambient light.

7. The optical system of claim 6, wherein the controller is also to adjust the illumination level of the screen depending upon the level of ambient light.

8. The optical system of claim 5, wherein the optical system further comprises a reflector to reflect internal light from the internal light source to the light pipe.

9. The optical system of claim 5, wherein the screen further comprises an electronic viewfinder of a still camera.

10. The optical system of claim 5, wherein the screen further comprises an electronic viewfinder of a video camera.

11. The optical system of claim 5, wherein the screen further comprises a display used for one of the devices in the group comprised of: a video camera, a still camera, a personal digital assistant, a remote control, a music player, and a game player.

12. The optical system of claim 5, wherein the external light sensor is positioned adjacent to the external light collector.

13. The optical system of claim 5 wherein the external light sensor is positioned adjacent to a backside of the screen.

14. The optical system of claim 5 wherein the external light sensor is positioned adjacent to a user side of the screen.

15. The optical system of claim 14, wherein the external light sensor detects light levels for at least one reference pixel.

16. A method to provide illumination, the method comprising:
   collecting ambient light for an optical system;
   determining if internal light is needed to supplement the ambient light; and
   directing the ambient light and the internal light to a light pipe, causing the ambient light and the internal light to be coupled.

17. The method of claim 16, wherein determining if internal light is needed further comprises monitoring a user input signal.

18. The method of claim 16, the method further comprising:
   monitoring a level of ambient light;
   comparing the level of ambient light to an upper threshold level; and
   reducing a brightness level in the optical system if the level of ambient light exceeds the upper threshold level.

19. The method of claim 18, wherein reducing a brightness level further comprises reducing a brightness level at a screen.

20. The method of claim 16, wherein determining if internal light is needed further comprises:
   monitoring a user-displayed brightness level;
   comparing it to a lower threshold level; and
   determining that internal light is needed if the user-displayed brightness level falls below the threshold level.

21. The method of claim 20, wherein the threshold level is determined dynamically.

22. The method of claim 20, wherein the threshold level is predetermined.

23. A method to provide illumination, the method comprising:
   collecting ambient light for an optical system;
   detecting a level of the ambient light;
   determining a level of internal light which, when coupled with the ambient light, reaches an illumination level;
   controlling an internal light source to provide the level of internal light; and
   using a light pipe to couple light from the internal light source with the ambient light.

24. The method of claim 23, wherein the method further comprises setting the illumination level based upon the ambient light.

25. The method of claim 23, wherein the method further comprises providing illumination at a predetermined illumination level to a screen.

26. The method of claim 23, the method further comprising:
   comparing the level of ambient light to an upper threshold level; and
   reducing a brightness level in the optical system if the level of ambient light exceeds the upper threshold level.

* * * * *